US011953133B2

(12) United States Patent
Oggier, III et al.

(10) Patent No.: US 11,953,133 B2
(45) Date of Patent: Apr. 9, 2024

(54) LOCKING CONNECTOR ASSEMBLY

(71) Applicant: Atomic Design, Inc., Lititz, PA (US)

(72) Inventors: Josef W. Oggier, III, Manheim, PA (US); Nicolas Artale, Lancaster, PA (US)

(73) Assignee: Atomic Design, Inc., Lititz, PA (US)

( * ) Notice: Subject to any disclaimer, the term of this patent is extended or adjusted under 35 U.S.C. 154(b) by 0 days.

(21) Appl. No.: 18/318,413

(22) Filed: May 16, 2023

(65) Prior Publication Data
US 2023/0304616 A1 Sep. 28, 2023

Related U.S. Application Data

(63) Continuation of application No. 16/582,402, filed on Sep. 25, 2019, now Pat. No. 11,686,412.

(51) Int. Cl.
| *F16L 37/086* | (2006.01) |
| *F16B 7/04* | (2006.01) |
| *F16L 37/10* | (2006.01) |

(52) U.S. Cl.
CPC .......... *F16L 37/086* (2013.01); *F16B 7/0413* (2013.01); *F16L 37/105* (2013.01)

(58) Field of Classification Search
CPC ........ F16B 7/0413; F16B 7/042; F16B 7/102; Y10T 403/32486; Y10T 403/32475;
(Continued)

(56) References Cited

U.S. PATENT DOCUMENTS 3,449,003 A * 6/1969 Hunt ...................... E03F 9/002
403/324
3,682,516 A * 8/1972 Savage ................... B25G 3/30
403/189
(Continued)

FOREIGN PATENT DOCUMENTS

| CN | 107895556 A | 4/2018 |
| DE | 1166146 B | 3/1964 |
| EP | 2236842 A1 | 10/2010 |

OTHER PUBLICATIONS

PCT Notification Concerning Transmittal of International Preliminary Report on Patentability and International Preliminary Report on Patentability, Application No. PCT/US2020/052741, dated Apr. 7, 2022, 10 pages.
(Continued)

*Primary Examiner* — Daniel J Wiley
(74) *Attorney, Agent, or Firm* — Barley Snyder

(57) ABSTRACT

A connector having a male component and a female component. The male component has a first tubular section, a second tubular section, and a midsection between the first tubular section and the second tubular section. The female component is connected to the second tubular section of the male component upon relative rotational movement between the male component and the female component and disconnected from the second tubular section of the male component upon relative rotational movement between the male component and the female component in a direction opposite to the direction when the male component and the female component are being connected. The female component has a bearing surface bearing against the midsection of the male component in a first position of the bearing surface and is spaced from the midsection of the male component in other positions of the female component.

8 Claims, 14 Drawing Sheets

(58) Field of Classification Search
CPC ........... Y10T 403/32524; Y10T 403/59; Y10T 403/599; Y10T 403/602
See application file for complete search history.

(56) References Cited

U.S. PATENT DOCUMENTS

| | | | | | |
|---|---|---|---|---|---|
| 4,042,305 | A | * | 8/1977 | Vincent | F16B 21/088 403/14 |
| 5,385,420 | A | * | 1/1995 | Newman, Sr. | B25G 3/30 403/299 |
| 5,579,558 | A | * | 12/1996 | Newman, Jr. | B05C 17/0205 81/177.1 |
| 6,595,713 | B1 | * | 7/2003 | Wilson | F16B 7/042 403/328 |
| 6,688,800 | B2 | * | 2/2004 | Kresge | F16D 1/112 403/325 |
| 7,549,195 | B2 | * | 6/2009 | Bensussan | B25G 1/04 16/427 |
| 7,721,391 | B2 | * | 5/2010 | Bukovitz | B25G 3/14 16/427 |
| 8,875,350 | B2 | * | 11/2014 | Bukovitz | C08F 293/00 16/427 |
| 9,346,077 | B2 | * | 5/2016 | Lambertson, Jr. | B05C 17/0205 |
| 2007/0017072 | A1 | * | 1/2007 | Serio | F16B 7/042 24/573.11 |
| 2010/0054852 | A1 | * | 3/2010 | Snyder | B25G 1/04 403/301 |
| 2014/0197123 | A1 | | 7/2014 | McPhillips | |

OTHER PUBLICATIONS

PCT Search Report and Written Opinion, Application No. PCT/US2020/052741, dated Dec. 11, 2020, 14 pages.

PCT International Report, Application No. PCT/US2020/052741, dated, Apr. 7, 2022, 10 pages.

* cited by examiner

LOCKING CONNECTOR ASSEMBLY

CROSS-REFERENCE TO RELATED APPLICATION

This application is a continuation of the U.S. application Ser. No. 16/582,402, filed on Sep. 25, 2019.

FIELD OF THE INVENTION

The invention relates to a connection system and, more particularly, to a locking connector system for connecting a plurality of modular units.

BACKGROUND

Decorative modular displays are commonly used in stage and set design. Generally, modular units are hung from a hanging support system using backdrop technology. A known modular display system uses a truss or theatre fly-system pipes to hang modular panels that clip together using rings or hooks to form a backdrop, which results in a decorative surface that is aesthetic while also increasing the range of available lighting effects. The backdrop is sized to fit the space required. In some circumstances, a floor support system may be used instead of a truss and/or backdrop. In the known floor support system, a temporary structure is set up from the floor, rather than suspended from the ceiling. The known floor support system includes metal pipes or tubes that connect to each other and the modular units hang from these metal pipes or tubes When using pipes in the known floor support system, connecting pipes are commonly over tightened and damaged. Furthermore, known support systems include complex or permanent attachment mechanisms used to connect one modular unit to an adjacent modular unit. Such attachment restricts replacement of each modular unit and limits the flexibility of the entire display system. These known designs are expensive and require tedious, time-consuming labor in both assembly and dis-assembly. It has long been desired to have a modular display support system, or any structure, including furniture, deck legs, truss connectors, grids and frame, that can be quickly and securely constructed and deconstructed without sacrificing the structural integrity of the system. Further, there is a need for a connector system that is locking and deters movement of connected pieces when secured together and locked.

SUMMARY

In view of the foregoing locking, a connector assembly, constructed in accordance with the present invention, is provided and includes a male component and a female component. The male component has a first tubular section, a second tubular section, and a midsection between the first tubular section and the second tubular section. The female component is connected to the second tubular section of the male component upon relative rotational movement between the male component and the female component and is disconnected from the second tubular section of the male component upon relative rotational movement between the male component and the female component in a direction opposite to the direction when the male component and the female component are being connected. The female component has a bearing surface bearing against the midsection of the male component in a first position of the bearing surface of the female component is spaced from the midsection of the male component in other positions of the female component.

A display system, constructed in accordance with the present invention, includes a base and a base insert having a flange above the base and a shank extending through the base. This display system also includes a locking connector assembly that has a male component and a female component. The male component of the locking connector assembly has a first tubular section, a second tubular section, and a midsection between the first tubular section and the second tubular section. The female component is connected to the second tubular section of the male component upon relative rotational movement between the male component and the female component and is disconnected from the second tubular section of the male component upon relative rotational movement between the male component and the female component in a direction opposite to the direction when the male component and the female component are being connected. The female component has a bearing surface bearing against the midsection of the male component in a first position of the bearing surface of the female component is spaced from the midsection of the male component in other positions of the female component. A display system, constructed in accordance with the present invention, further includes a pole having a first end connected to the locking connector assembly and a second end connected to the base insert. A display system, constructed in accordance with the present invention, also includes a display panel and a base insert catch beneath the base aligned axially with the base insert and fixed to the base insert for anti-rotation.

BRIEF DESCRIPTION OF THE DRAWINGS

The invention will now be described by way of example with reference to the accompanying figures, of which.

DETAILED DESCRIPTION OF THE INVENTION

Figures 1, 2A:
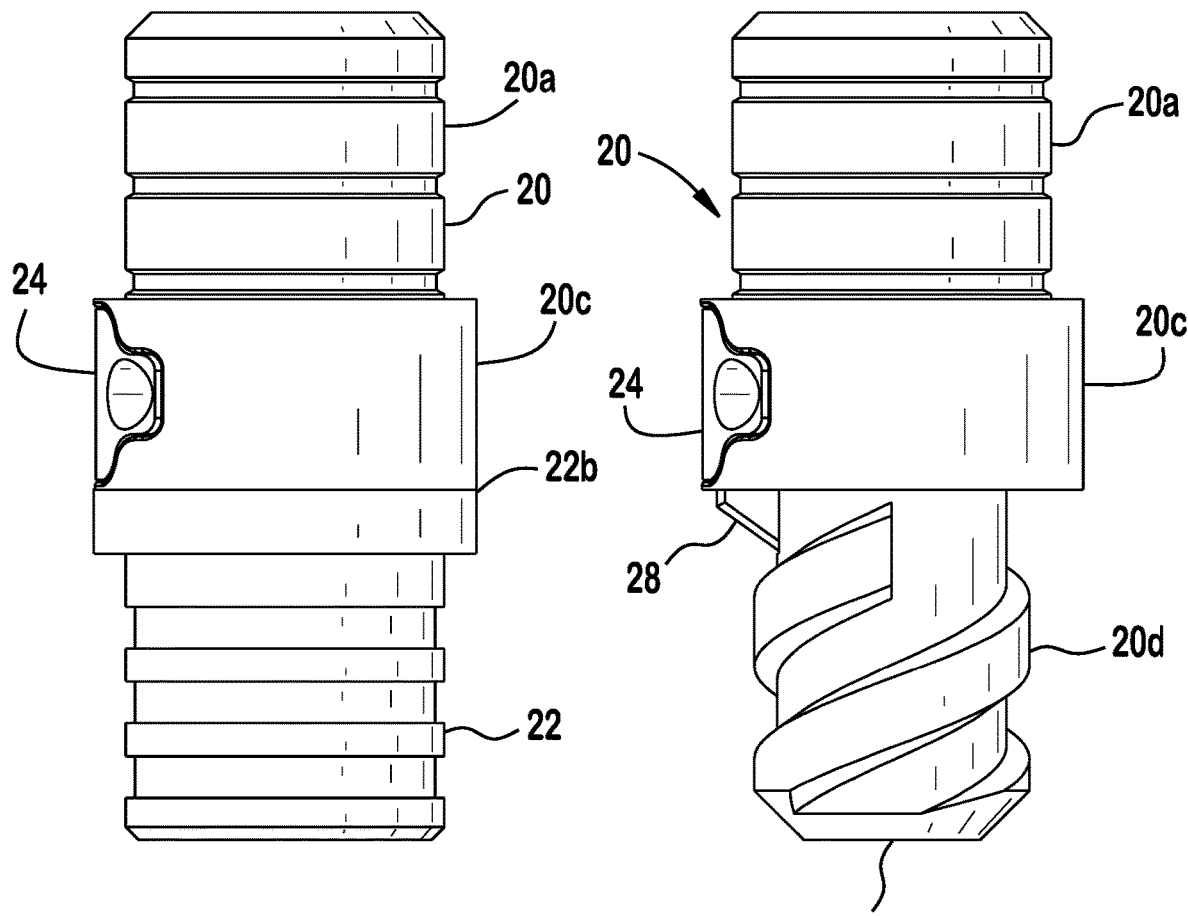
FIG. 1 is a front view of a locking connector assembly constructed in accordance with the present invention after assembly.
FIG. 2A is a front view of the male component of a locking connector assembly constructed in accordance with the present invention.
Figure 2B:
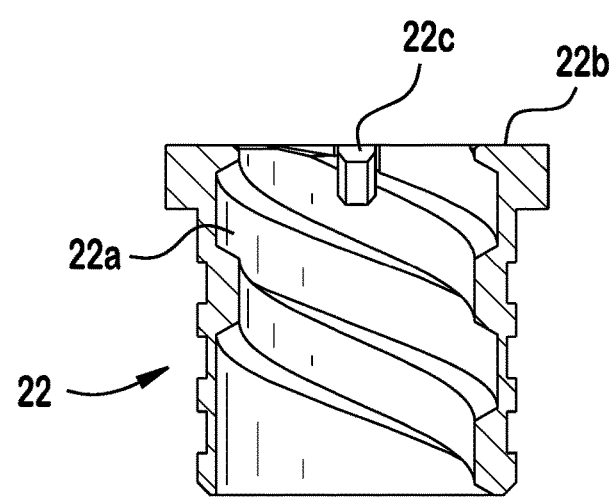
FIG. 2B is a cross-section view of the female component of a locking connector assembly constructed in accordance with the present invention.
Figure 3:
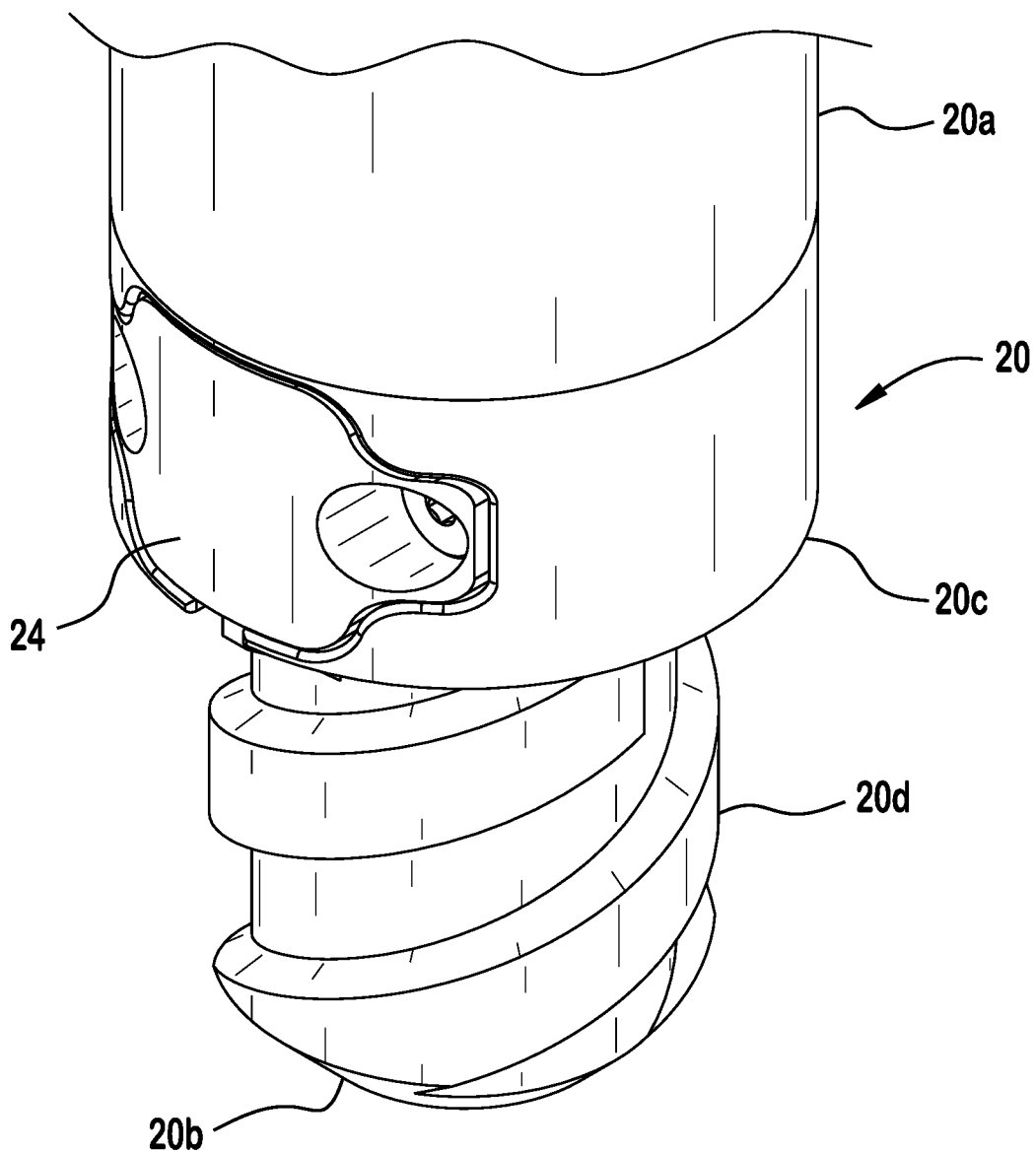
FIG. 3 is a perspective view of a portion of the male component of a locking connector assembly constructed in accordance with the present invention.
Figure 4:
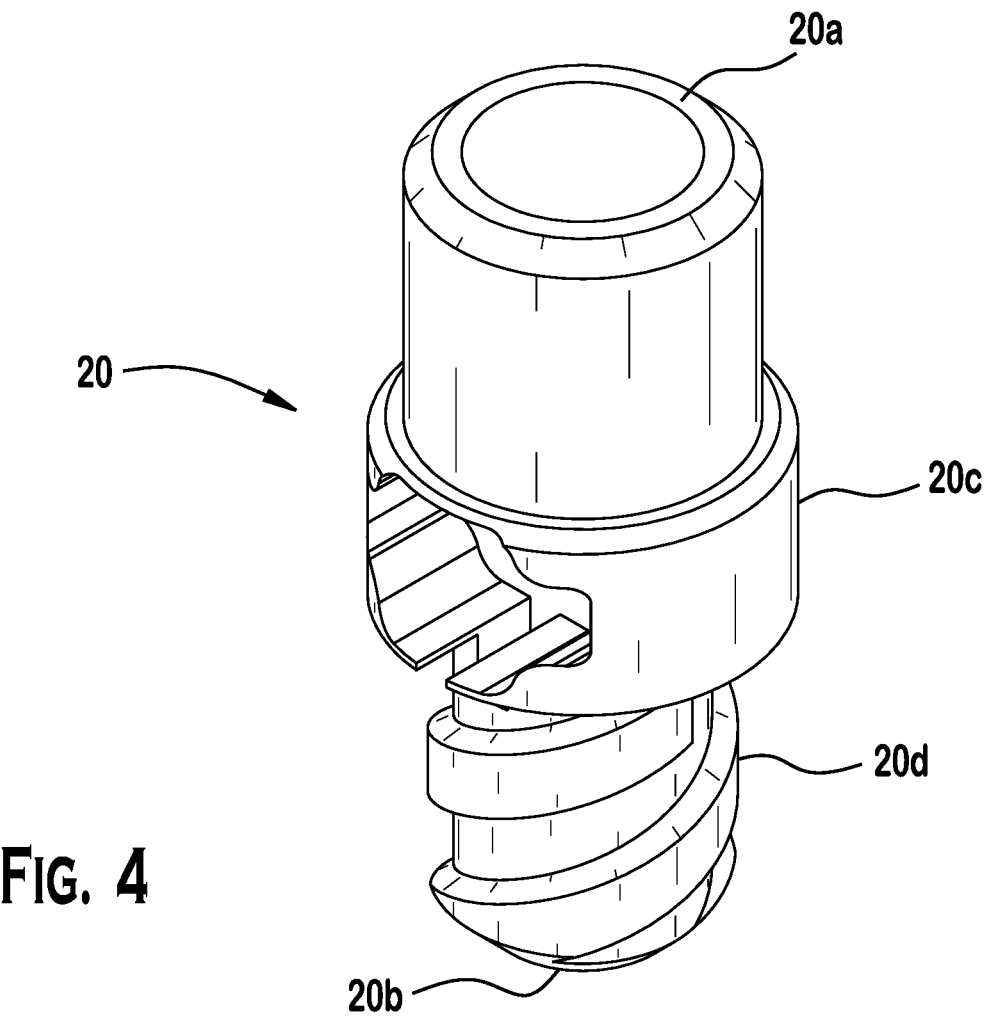
FIG. 4 is a perspective view, partially broken away, of the male component of a locking connector assembly constructed in accordance with the present invention.
Figure 5:
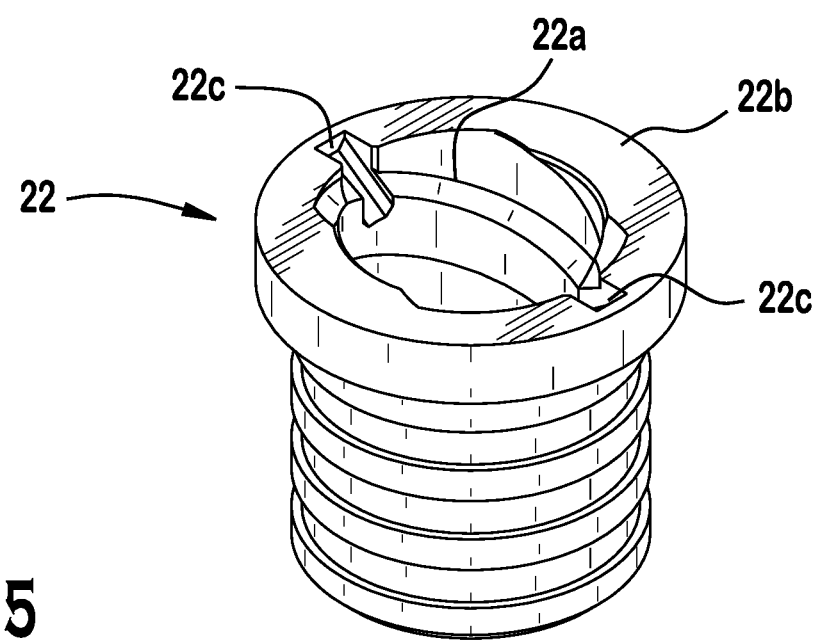
FIG. 5 is a perspective view of the female component of a locking connector assembly constructed in accordance with the present invention.

The invention is explained in greater detail below with reference to embodiments of a modular display system. The invention, may, however, be embodied in many different forms and should not be construed as limited to the embodiments set forth herein; rather, these embodiments are provided so that this disclosure will be thorough and complete and still fully convey the scope of the invention to those skilled in the art.

Referring to FIGS. 1 through 8B, a locking connector assembly, constructed in accordance with the present invention, includes a male component 20 and a female component 22. Male component 20 has a first tubular section 20a, a second tubular section 20b, and a midsection 20c between first tubular section 20a and second tubular section 20b. Second tubular section 20b of male component 20 has an external thread 20d along the length thereof. For the embodiment of the present invention being described, external thread 20d of second tubular section 20b of male component 20 is a double helix A locking connector assembly, constructed in accordance with the present invention, also includes a female component 22 connected to second tubular section 20b of male component 20 upon relative rotational movement between the male component and the female component. Female component 22 also is disconnected from second tubular section 20b of male component upon relative rotational movement between the male component and the female component in a direction opposite to the direction when the male component and the female component are being connected. Female component 22 has an internal thread 22a along the length thereof engaged with the external thread 20d of the first tubular section of male component 20 upon relative rotational movement between the male component and the female component. For the embodiment of the present invention being described, internal thread 22a of female component 22 is a double helix.

Female component 22 has a bearing surface 22b that bears against midsection 20c of male component 20 in a first position of the bearing surface of the female component as shown in FIG. 1 and is spaced from the midsection of the male component in other positions of the female component until female component 22 is connected to male component 20 upon relative rotational movement between the male component and the female component.

Bearing surface 22b of female component 22 has at least one notch 22c and can have additional notches such as a second notch 22c spaced 180° from the first notch as shown in FIG. As will be explained below, notches 22c serve to lock female component 22 to male component 20 upon relative rotational movement between the male component and the female component.

Figure 6:
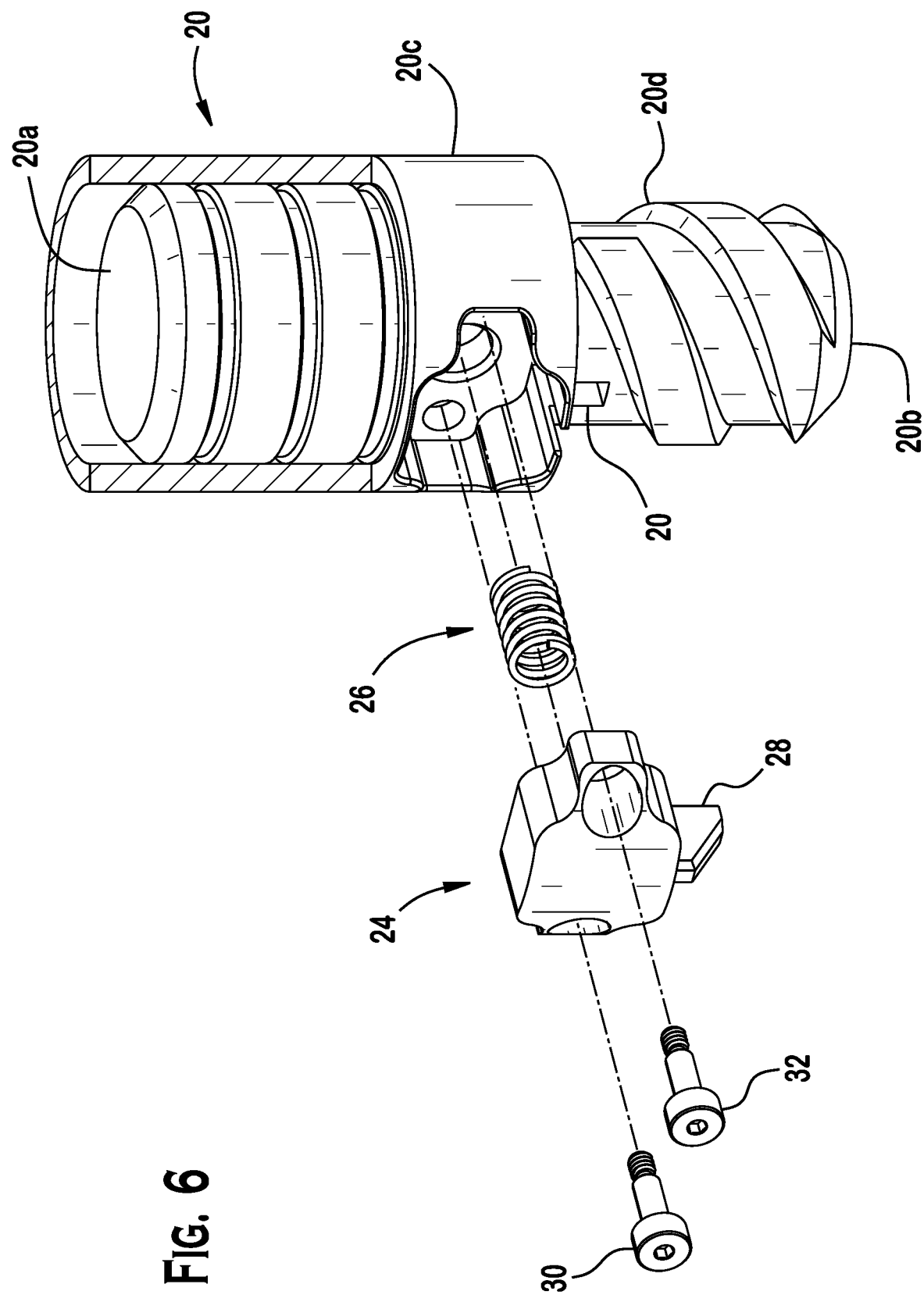
FIG. 6 is an exploded perspective view of the male component of a locking connector assembly constructed in accordance with the present invention.
Figure 7A:
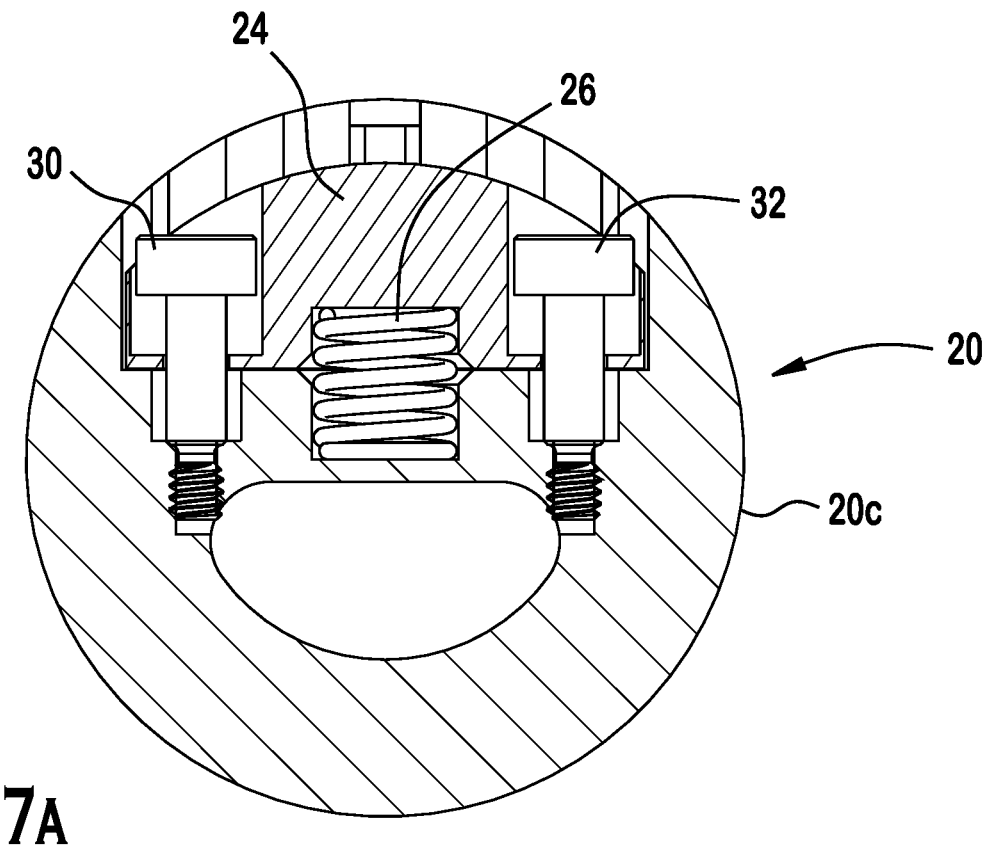
FIG. 7A is a cross-section view of the male component of a locking connector assembly constructed in accordance with the present invention in a first condition of operation of the locking connector assembly.
Figure 7B:
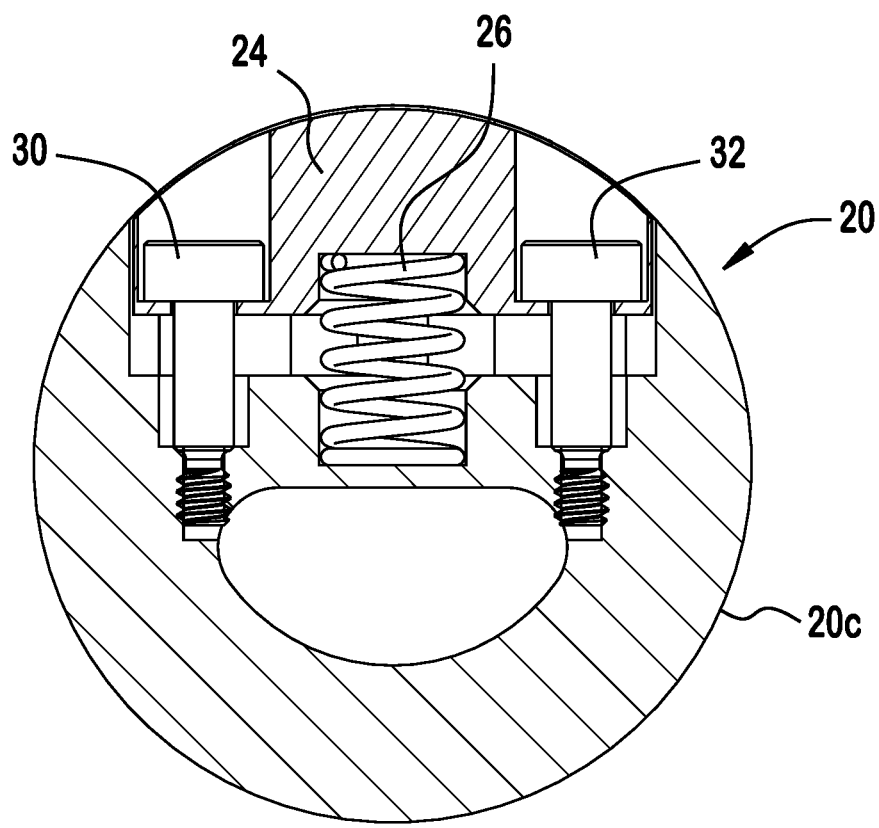
FIG. 7B is a cross-section view of the male component of a locking connector assembly constructed in accordance with the present invention in a second condition of operation of the locking connector assembly.
Figure 8A:
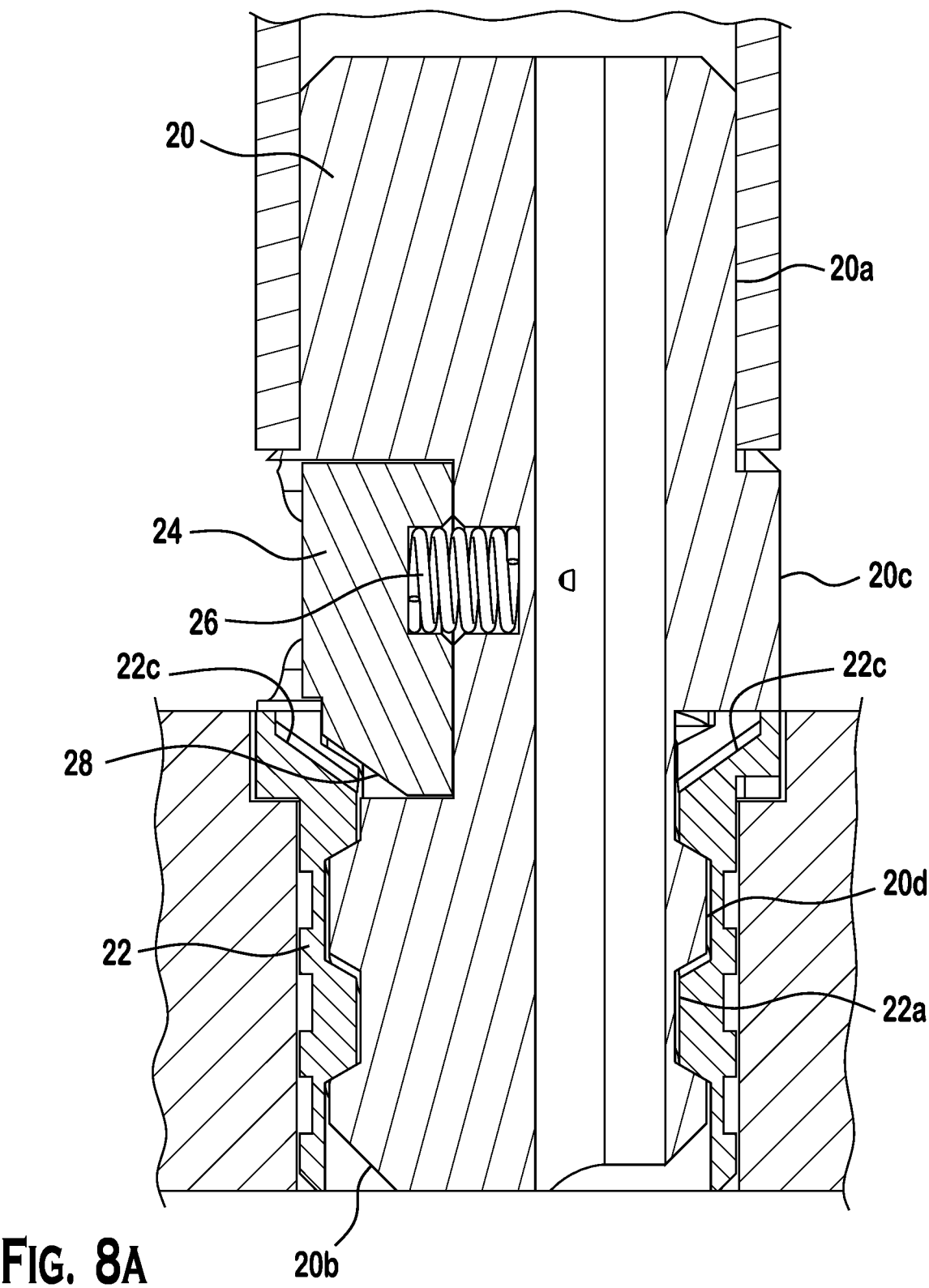
FIG. 8A is a second cross-section view of the male component of a locking connector assembly constructed in accordance with the present invention in the first condition of operation of the locking connector assembly.
Figure 8B:
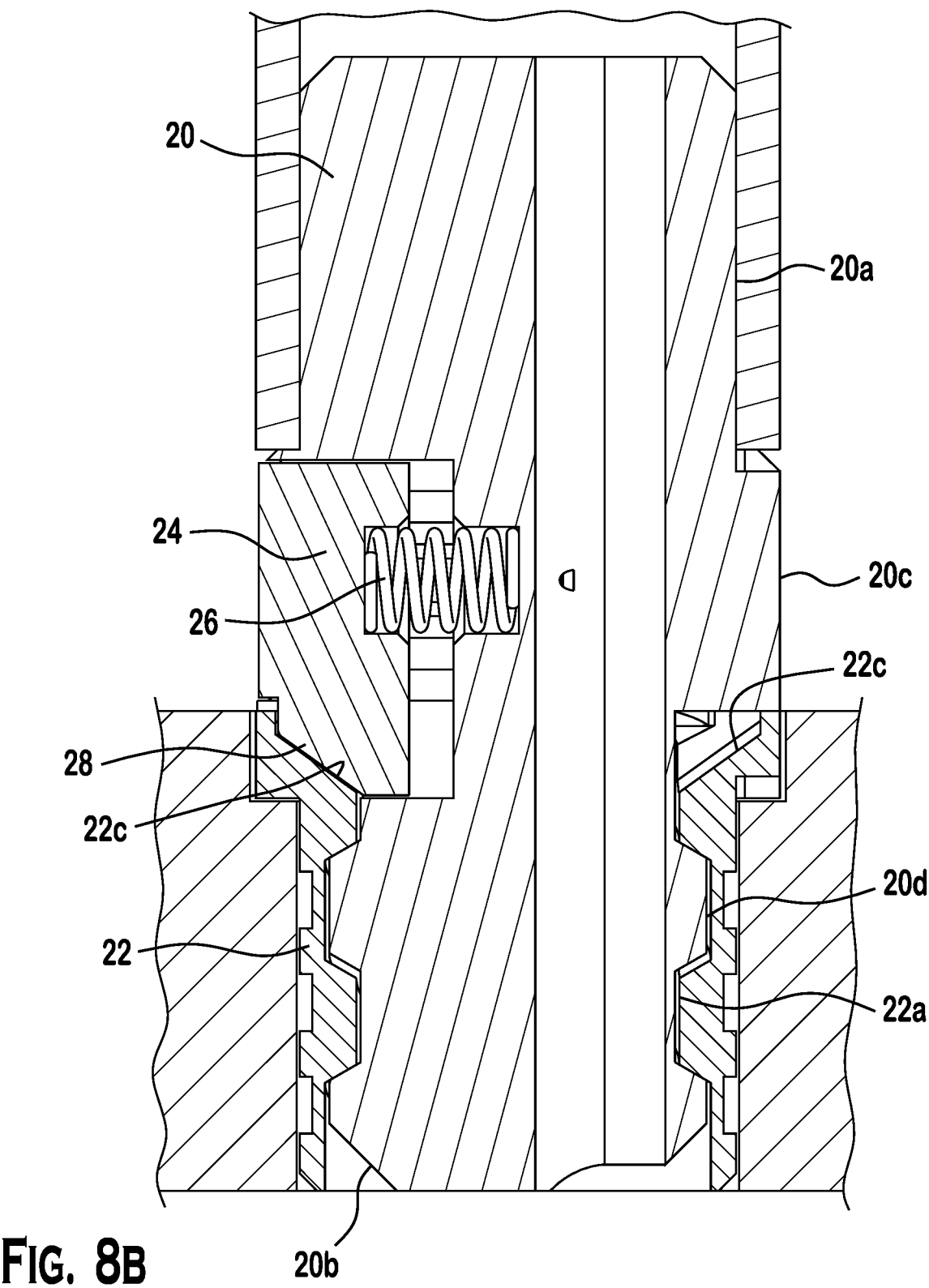
FIG. 8B is a second cross-section view of the male component of a locking connector assembly constructed in accordance with the present invention in the second condition of operation of the locking connector assembly.
Figure 9:
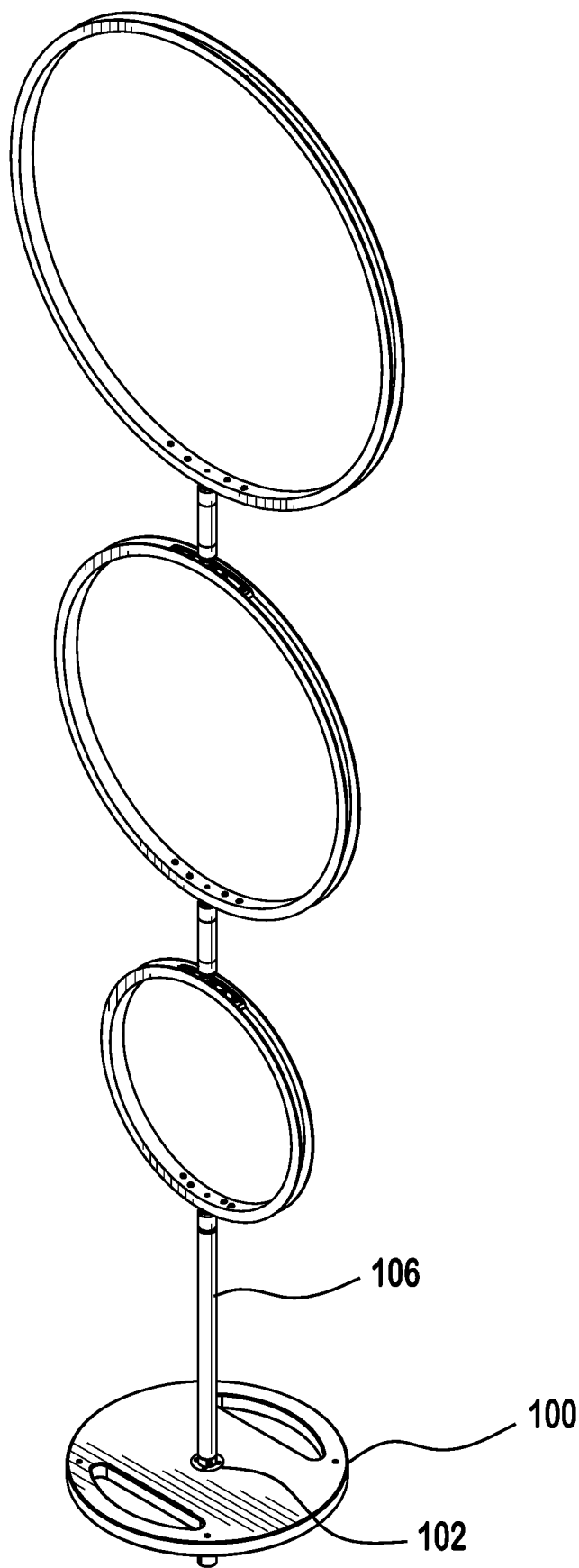
FIG. 9 is a perspective view of a display system constructed in accordance with the present invention.
Figure 10:
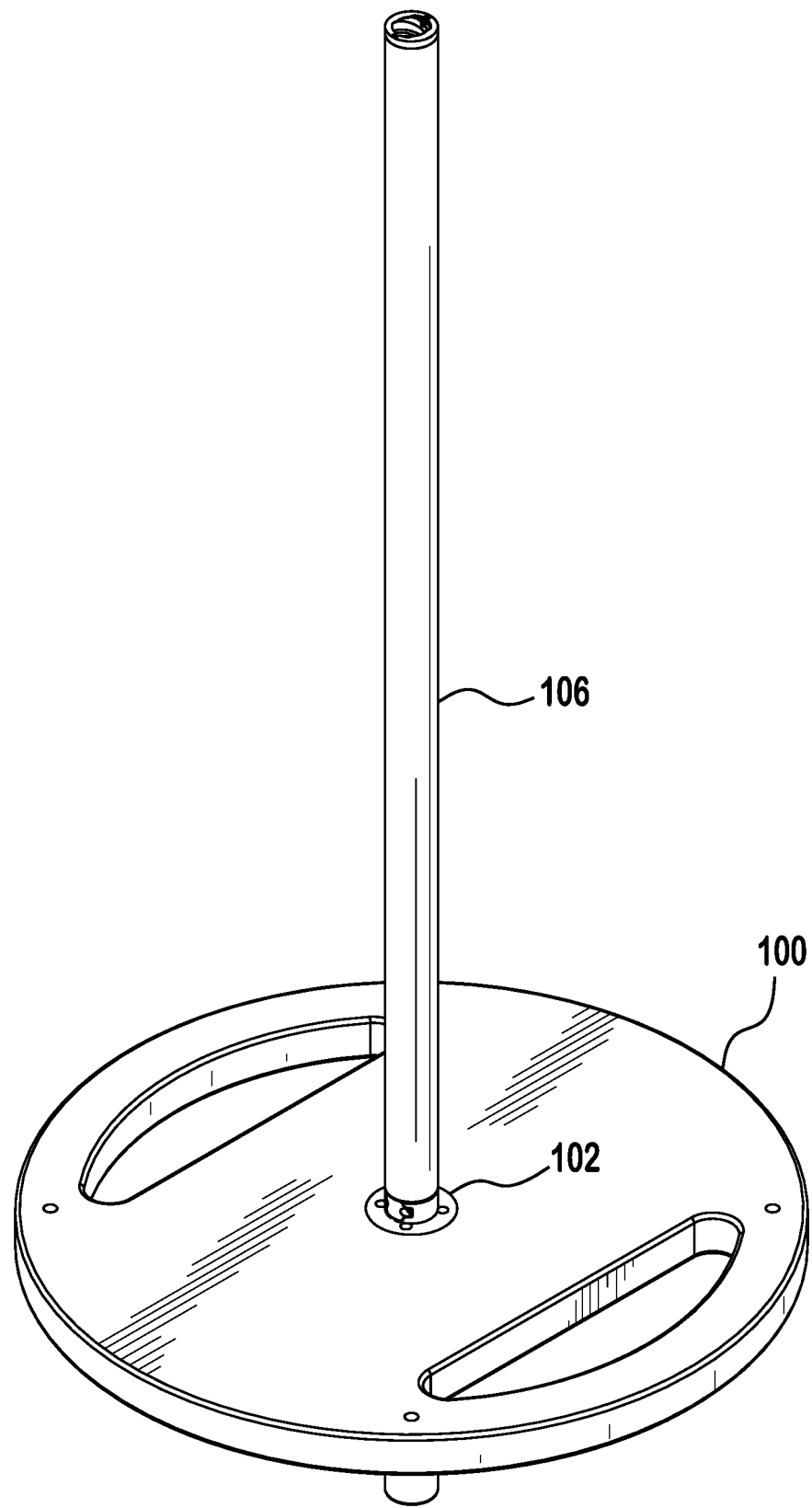
FIG. 10 is a perspective view of a portion of a display system constructed in accordance with the present invention.
Figure 11:
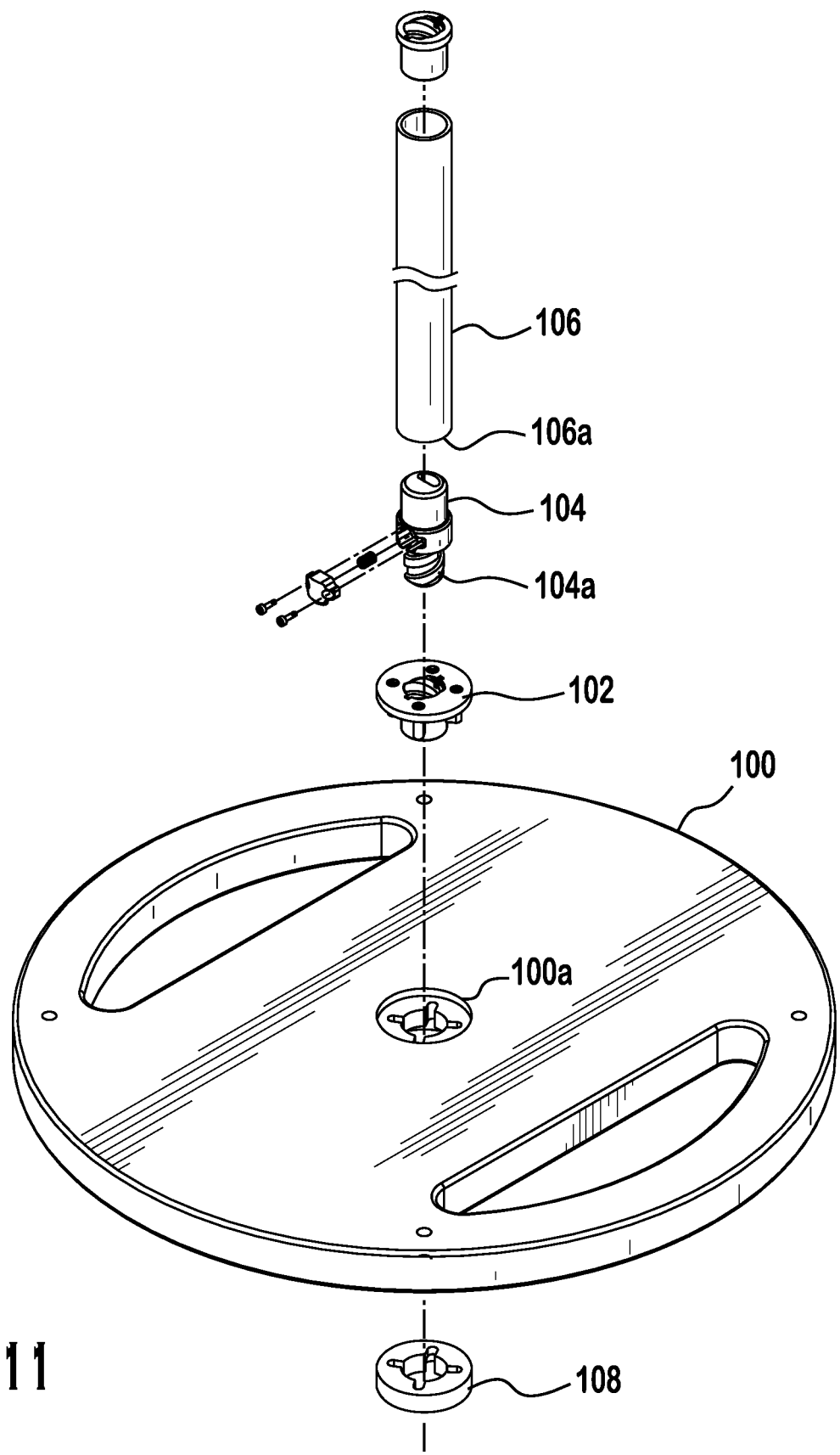
FIG. 11 is an exploded perspective view of portions of a display system constructed in accordance with the present invention.
Figure 12:
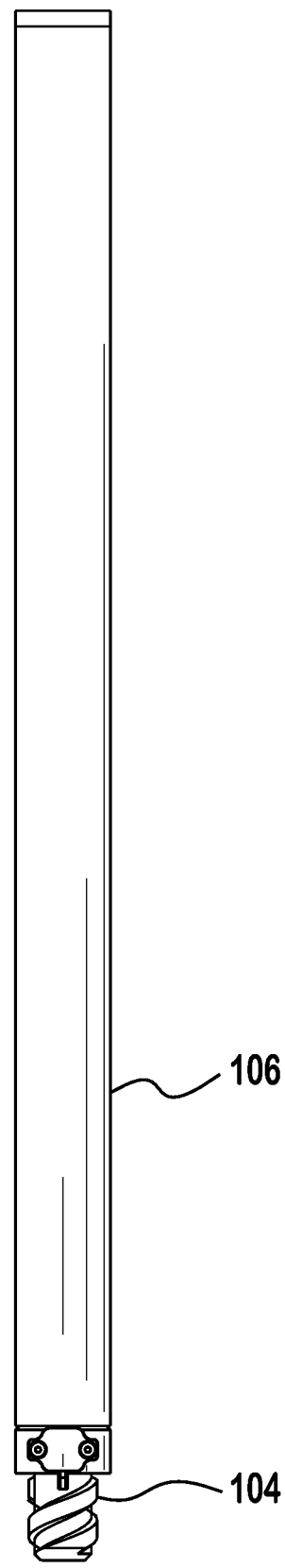
FIG. 12 is a front view of a portion of a display system constructed in accordance with the present invention.
Figure 13:
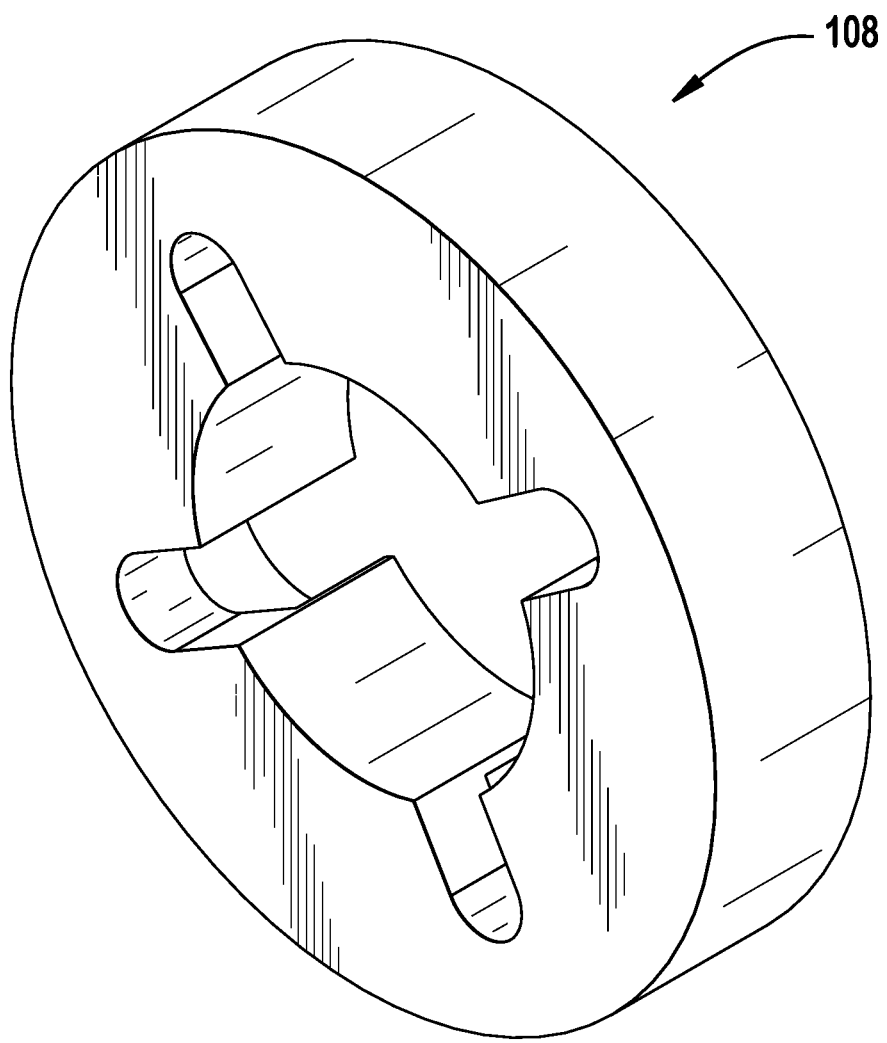
FIG. 13 is a perspective view of a base insert catch which is part of a display system constructed in accordance with the present invention.
Figure 14A:
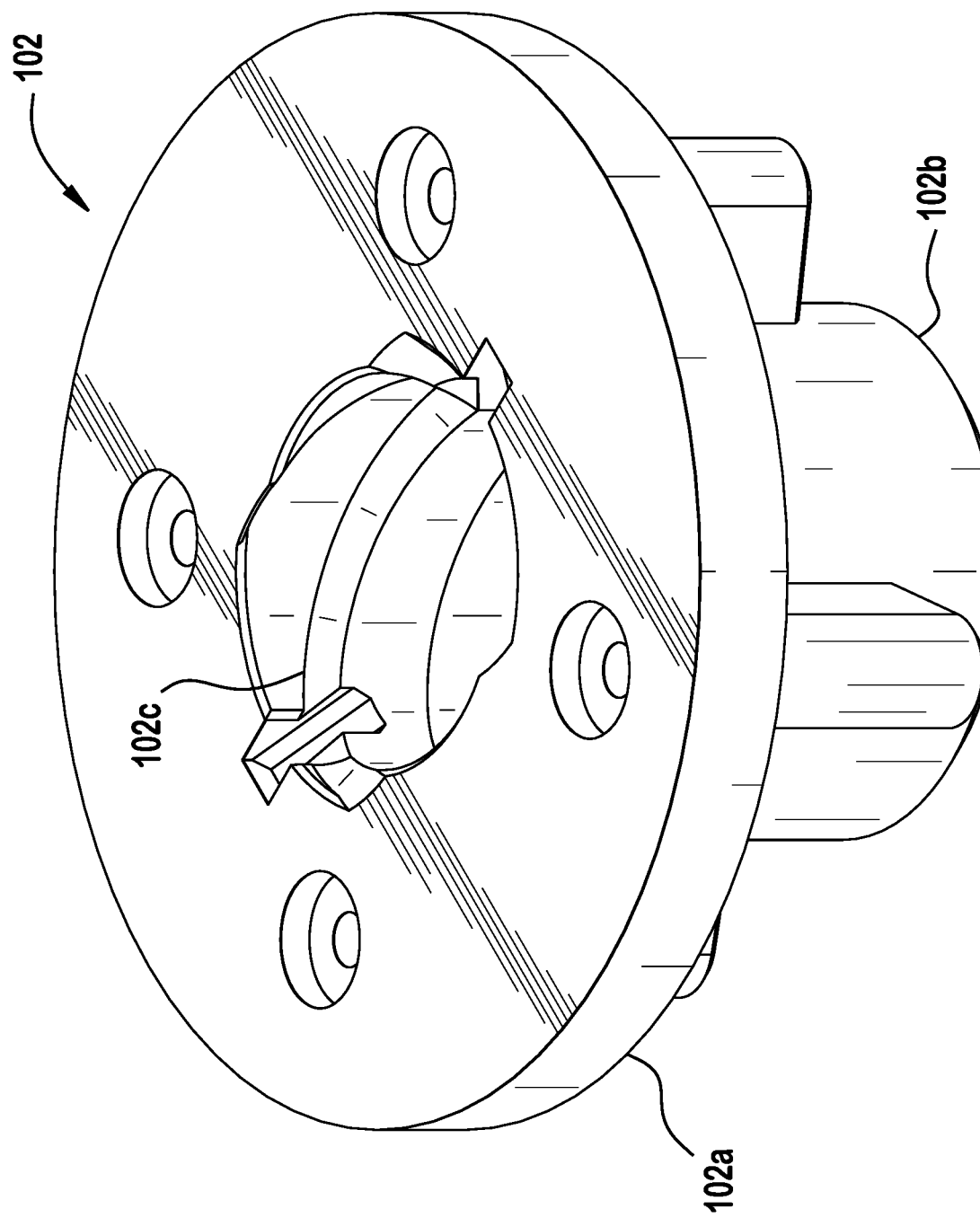
FIG. 14A is a perspective view of a base insert for of the FIG. 13 base insert catch and which is part of a display system constructed in accordance with the present invention.
Figure 14B:
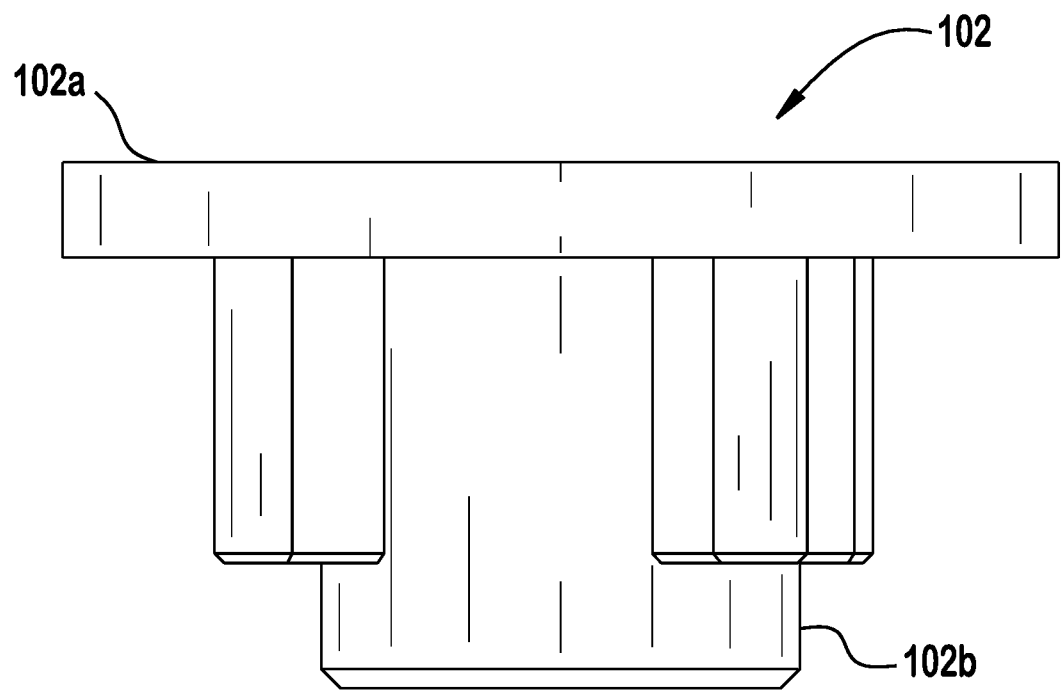
FIG. 14B is a side view of the FIG. 14A base insert catch.
Figure 14C:
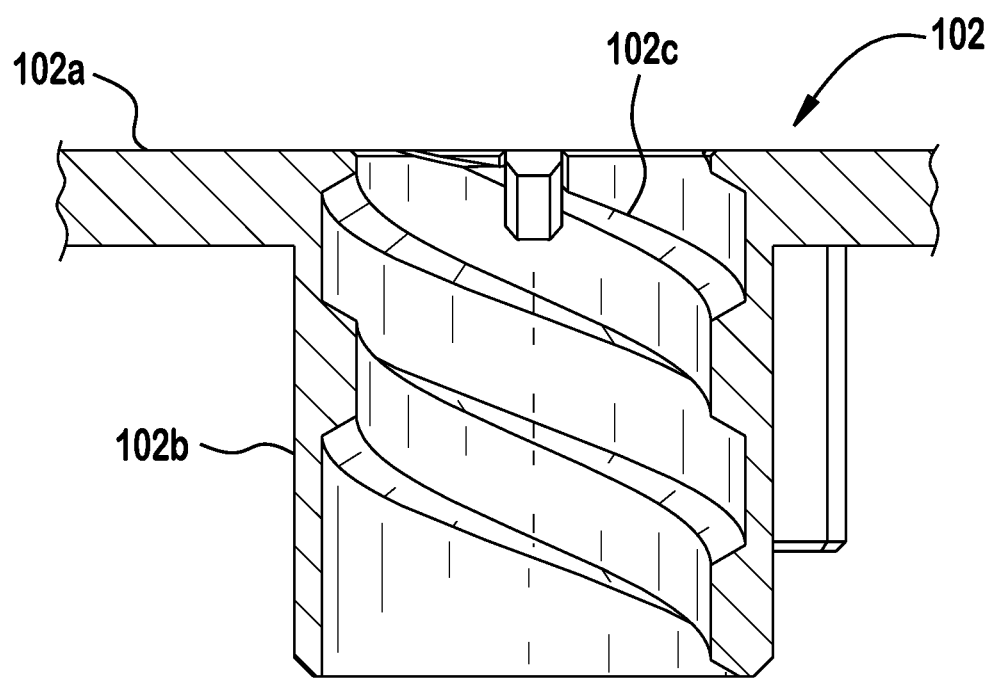
FIG. 14C is a sectional view of the FIGS. 14A and 14B base insert catch.

Midsection 20c of male component 20 has a switch mechanism that includes a switch 24, a resilient device 26, and a catch 28. Switch 24, for example a pushbutton switch, is movable between a first, at rest, position and a second depressed position. As shown in FIGS. 6, 7A, and 7B, switch 24 can be secured in midsection 20c of male component 20 by a pair of set fasteners 30 and 32, such as bolts, screws, or other known fasteners.

The resilient device 26, such as a spring, compresses in response to movement of switch 24 from the first position of the switch to the second position of the switch. The resilient device 26 expands in response to movement of switch 24 from the second position of the switch to the first position of the switch.

The resilient device 26 urges catch 28 to bear against bearing surface 22b of female component 22 and enter the notch in the bearing surface of the female component first encountered upon relative rotational movement between male component 20 and female component 22.

Catch 28 is movable with switch 24 between: a first position outside a notch 22c in bearing surface 22b of female component 22 and bearing against the bearing surface of the female component and a second position in a notch in the bearing surface of the female component. For the embodiment of the present invention being described, catch 28 is integral with switch 24. Catch 28 enters that notch 22c that is encountered first upon relative rotational movement between male component 20 and the female component 22.

Referring to FIGS. 9 through 14C, a display system, constructed in accordance with the present invention, includes a base 100 and a base insert 102. Base insert 102 has a flange 102a above base 100 and a shank 102b extending through a through-hole opening 100a in base 100.

A display system, constructed in accordance with the present invention, also includes a locking connector assembly 104, such as the locking connector assembly described above in connection with FIGS. 1 through 8B. Instead of repeating the entirety of the text above that is descriptive of this locking connector assembly, the above description of this connector is incorporated to the extent necessary to provide an understanding of how this locking connector assembly functions with the other components of a display system, constructed in accordance with the present intention, to produce the desired results. When the display system is assembled, the locking connector assembly is secured to base insert 102 by the threaded engagement of external thread 104a of locking connector assembly and internal thread 102c of base insert 102.

A display system, constructed in accordance with the present invention, also includes a pole 106. When the display system is assembled, a first end 106a of pole 106 is connected to locking connector assembly 104. and a second end 106b connected to the base insert 102.

A display system constructed in accordance with the present invention further includes a base insert catch 108 beneath base 100 and aligned axially with base insert 102 and fixed to base insert 102 for anti-rotation.

A display system, constructed in accordance with the present invention, may also include a display panel (not shown).

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A locking connector assembly comprising:
    a male component having:
        a first tubular section,
        a second tubular section having an external thread along a length thereof, and
        a midsection positioned between the first tubular section and the second tubular section having a radially movable switch mechanism; and
    a female component having:
        a bearing surface bearing against the midsection of the male component in a first position of the bearing surface of the female component, and spaced from the midsection of the male component in other positions of the female component;
        an internal thread along the length thereof engaged with the external thread of the second tubular section of the male component; and
        a notch on the bearing surface;
    the switch mechanism is engaged with the notch in a first radial position, and is disengaged with the notch in a second radial position.

2. The locking connector assembly according to claim 1, wherein the female component is connected to the second tubular section of the male component upon relative rotational movement between the male component and the female component.

3. The locking connector assembly according to claim 2, wherein the female component is disconnected from the second tubular section of the male component upon relative rotational movement between the male component and the female component in a direction opposite to the direction when the male component and the female component are being connected.

4. The locking connector assembly according to claim 1, wherein the external thread of the second tubular section of the male component is a double helix and the internal thread of the female component is a double helix.

5. A display system comprising:
    a base;
    a base insert having a flange above the base and a shank extending through the base;
    a locking connector assembly according to claim 1;
    a pole having a first end connected to the locking connector assembly and a second end connected to the base insert; and
    a base insert catch beneath the base aligned axially with the base insert and fixed to the base insert for anti-rotation.

6. The display system of claim 5, wherein the female component is connected to the second tubular section of the male component upon relative rotational movement between the male component and the female component.

7. The display system of claim 6, wherein the female component is disconnected from the second tubular section of the male component upon relative rotational movement between the male component and the female component in a direction opposite to the direction when the male component and the female component are being connected.

8. The display system of claim 5, wherein the external thread of the second tubular section of the male component is a double helix and the internal thread of the female component is a double helix.

* * * * *